United States Patent
Song et al.

(10) Patent No.: US 8,249,140 B2
(45) Date of Patent: Aug. 21, 2012

(54) DIRECT MACROBLOCK MODE TECHNIQUES FOR HIGH PERFORMANCE HARDWARE MOTION COMPENSATION

(75) Inventors: Qingjian Song, Shanghai (CN); Xing Tang, Shanghai (CN); Wenfeng Liu, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 1494 days.

(21) Appl. No.: 11/323,173

(22) Filed: Dec. 30, 2005

(65) Prior Publication Data

US 2007/0153008 A1 Jul. 5, 2007

(51) Int. Cl.
H04N 7/12 (2006.01)

(52) U.S. Cl. ............. 375/240.01; 375/240; 375/240.1; 375/240.24; 348/714; 348/721; 345/501; 345/502; 345/503

(58) Field of Classification Search ............ 375/240, 375/240.01, 240.1, 240.24, 240.26; 345/501, 345/502, 503; 348/714, 715, 716, 721
See application file for complete search history.

(56) References Cited

U.S. PATENT DOCUMENTS

| | | | | |
|---|---|---|---|---|
| 2003/0005262 | A1* | 1/2003 | Kottapalli et al. | 712/207 |
| 2004/0101056 | A1* | 5/2004 | Wong et al. | 375/240.25 |

FOREIGN PATENT DOCUMENTS

| | | | |
|---|---|---|---|
| EP | 1009170 A2 * | 6/2000 | |
| JP | 60-502230 A | 12/1985 | |
| JP | 4-021151 A | 1/1992 | |
| JP | 6-131194 A | 5/1994 | |
| JP | 10-260832 A | 9/1998 | |
| JP | 11-298857 A | 10/1999 | |
| JP | 2001-084215 A | 3/2001 | |
| JP | 2002-027483 A | 1/2002 | |
| JP | 2003-284024 A | 10/2003 | |
| JP | 2004-056806 A | 2/2004 | |
| WO | 03/043345 A1 | 5/2003 | |
| WO | 2004/095708 A2 | 11/2004 | |
| WO | 2007078888 A1 | 7/2007 | |

OTHER PUBLICATIONS

Jonathan Corbet, Greg Kroah-Hartman, Alessandro Rubini, Linux Device Drivers, Feb. 2005, O'Reilly, 3rd Edition, pp. 412-463.*
Non-Final Office Action Mailed Jan. 26, 2010, Taiwanese Patent Application No. 95147449.
International Search Report and Written Opinion for Application No. PCT/US2006/048046, (May 16, 2007), 13 pages.

(Continued)

Primary Examiner — King Poon
Assistant Examiner — Jamares Q Washington
(74) Attorney, Agent, or Firm — Kacvinsky Daisak, PLLC

(57) ABSTRACT

Direct macroblock mode techniques for high performance hardware motion compensation are described. An embodiment includes a hardware motion compensation graphics display device driver. More specifically, an embodiment mitigates a macroblock data parsing bottleneck in the display device driver by directly generating macroblock instructions and storing them in a dedicated buffer. For example, an embodiment includes an independent direct memory access instruction execution buffer for macroblock instructions separate from the direct memory access instruction execution buffer for all other hardware motion compensation instructions. Other embodiments are described and claimed.

12 Claims, 5 Drawing Sheets

OTHER PUBLICATIONS

Oehring, H., et al., "MPEG-2 video decompression on simultaneous multithreaded multimedia processors", Proceedings of the International Conference on Parallel Architectures and Compilation Techniques, 1999, IEEE Computer Society, (Oct. 12-16, 1999), pp. 11-16.

Office Action received for Taiwan Patent Application No. 95147449, mailed on Oct. 29, 2010, 7 pages of Office Action.

Office Action received for Japanese Patent Application No. 2008-548587, mailed on Dec. 7, 2010, 9 pages of Office Action including 5 pages of English Translation.

Notice of Allowance received for Taiwan Patent Application No. 95147449, mailed on Aug. 22, 2011, 3 pages of Notice of Allowance including 1 page of English Translation.

Office Action received for Japanese Patent Application No. 2008-548587, mailed on Apr. 26, 2011, 8 pages of Office Action including 4 pages of English Translation.

Office Action received for European Patent Application No. 06845625.0, mailed on May 15, 2009, 2 pages.

Office Action received for Chinese Patent Application No. 200680042704.9, mailed on Sep. 4, 2009, 5 pages of Office Action including 2 pages of English Translation.

Office Action received for Chinese Patent Application No. 200680042704.9, mailed on Nov. 9, 2011, 6 pages of Office Action including 2 pages of English Translation.

* cited by examiner

DIRECT MACROBLOCK MODE TECHNIQUES FOR HIGH PERFORMANCE HARDWARE MOTION COMPENSATION

BACKGROUND

The Motion Picture Experts Group (MPEG) of the International Organization for Standardization and the International Electrotechnical Commission has developed the MPEG-2 standard capable of coding standard-definition television at bit rates of approximately 3-15 Mbps and high-definition television at approximately 15-30 Mbps. Further, as an enhancement over its MPEG-1 predecessor, MPEG-2 adds multiple channel surround sound audio coding.

The MPEG-2 coding, versus its approximate television equivalent, operates at a reduced bit rate by removing redundant information from the video/audio signal at the coder prior to transmitting the video/audio signal. The redundant information may then be added back at the decoder. The MPEG-2 bit rate reduction scheme relies both on special and temporal redundancy and psychovisual redundancy to reduce the bit rate of a video/audio signal substantially without detection by the viewer. Temporal redundancy may refer to pixel values that are not independent but are correlated to their neighbors both within the same video frame and across multiple video frames. Psychovisual redundancy may refer to limits for a viewer's eyes for fine detail at their vision periphery and around video shot changes.

DETAILED DESCRIPTION

Embodiments of a direct macroblock driver for hardware motion compensation (HWMC) and method thereof are described. One embodiment, for example, comprises a HWMC graphics display device driver and method of operation thereof. More specifically, an embodiment mitigates a macroblock data-parsing bottleneck in the display device driver by directly generating macroblock instructions and storing them in a dedicated buffer. For example, an embodiment includes an independent DMA instruction execution buffer for macroblock instructions separate from the DMA instruction execution buffer for all other HWMC instructions. The generation and separation of the macroblock instructions from other HWMC instructions further allows better utilization of a dedicated Graphics Processing Unit (GPU) to share processor workload for a general Central Processing Unit's (CPU) graphics display device driver.

Figure 1:
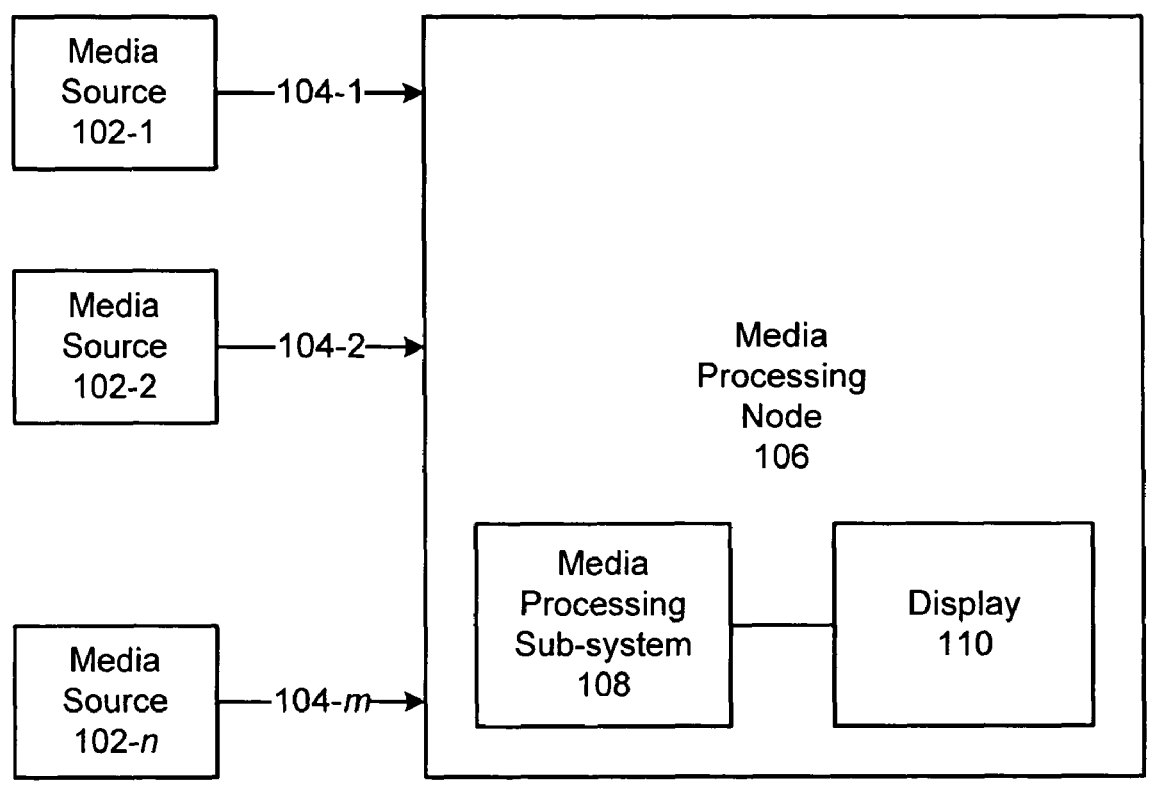
FIG. 1 illustrates one embodiment of a media processing system.

FIG. 1 illustrates one embodiment of a system. FIG. 1 illustrates a block diagram of a media processing system 100. In one embodiment, for example, media processing system 100 may include multiple nodes. A node may comprise any physical or logical entity for processing and/or communicating information in media processing system 100 and may be implemented as hardware, software, or any combination thereof, as desired for a given set of design parameters or performance constraints. Although FIG. 1 is shown with a limited number of nodes in a certain topology, it may be appreciated that media processing system 100 may include more or less nodes in any type of topology as desired for a given implementation. The embodiments are not limited in this context.

In various embodiments, a node may comprise, or be implemented as, a computer system, a computer sub-system, a computer, an appliance, a workstation, a terminal, a server, a personal computer (PC), a laptop, an ultra-laptop, a hand-held computer, a personal digital assistant (PDA), a television, a digital television, a set top box (STB), a telephone, a mobile telephone, a cellular telephone, a handset, a wireless access point, a base station (BS), a subscriber station (SS), a mobile subscriber center (MSC), a radio network controller (RNC), a microprocessor, an integrated circuit such as an application specific integrated circuit (ASIC), a programmable logic device (PLD), a processor such as general purpose processor, a digital signal processor (DSP) and/or a network processor, an interface, an input/output (I/O) device (e.g., keyboard, mouse, display, printer), a router, a hub, a gateway, a bridge, a switch, a circuit, a logic gate, a register, a semiconductor device, a chip, a transistor, or any other device, machine, tool, equipment, component, or combination thereof. The embodiments are not limited in this context.

In various embodiments, a node may comprise, or be implemented as, software, a software module, an application, a program, a subroutine, an instruction set, computing code, words, values, symbols or combination thereof. A node may be implemented according to a predefined computer language, manner or syntax, for instructing a processor to perform a certain function. Examples of a computer language may include C, C++, Java, BASIC, Perl, Matlab, Pascal, Visual BASIC, assembly language, machine code, microcode for a processor, and so forth. The embodiments are not limited in this context.

In various embodiments, media processing system 100 may communicate, manage, or process information in accordance with one or more protocols. A protocol may comprise a set of predefined rules or instructions for managing communication among nodes. A protocol may be defined by one or more standards as promulgated by a standards organization, such as, the International Telecommunications Union (ITU), the International Organization for Standardization (ISO), the International Electrotechnical Commission (IEC), the Institute of Electrical and Electronics Engineers (IEEE), the Internet Engineering Task Force (IETF), the Motion Picture Experts Group (MPEG), and so forth. For example, the described embodiments may be arranged to operate in accordance with standards for media processing, such as the National Television System Committee (NTSC) standard, the Phase Alteration by Line (PAL) standard, the MPEG-1 standard, the MPEG-2 standard, the MPEG-4 standard, the Digital Video Broadcasting Terrestrial (DVB-T) broadcasting standard, the ITU/IEC H.263 standard, Video Coding for Low Bitrate Communication, ITU-T Recommendation H.263v3, published November 2000 and/or the ITU/IEC H.264 standard, Video Coding for Very Low Bit Rate Communication, ITU-T Recommendation H.264, published May 2003, and so forth. The embodiments are not limited in this context.

In various embodiments, the nodes of media processing system 100 may be arranged to communicate, manage or process different types of information, such as media information and control information. Examples of media information may generally include any data representing content meant for a user, such as voice information, video information, audio information, image information, textual information, numerical information, alphanumeric symbols, graphics, and so forth. Control information may refer to any data representing commands, instructions or control words meant for an automated system. For example, control information may be used to route media information through a system, to establish a connection between devices, instruct a node to process the media information in a predetermined manner, and so forth. The embodiments are not limited in this context.

In various embodiments, media processing system 100 may be implemented as a wired communication system, a wireless communication system, or a combination of both. Although media processing system 100 may be illustrated using a particular communications media by way of example, it may be appreciated that the principles and techniques discussed herein may be implemented using any type of communication media and accompanying technology. The embodiments are not limited in this context.

When implemented as a wired system, for example, media processing system 100 may include one or more nodes arranged to communicate information over one or more wired communications media. Examples of wired communications media may include a wire, cable, printed circuit board (PCB), backplane, switch fabric, semiconductor material, twisted-pair wire, co-axial cable, fiber optics, and so forth. The wired communications media may be connected to a node using an input/output (I/O) adapter. The I/O adapter may be arranged to operate with any suitable technique for controlling information signals between nodes using a desired set of communications protocols, services or operating procedures. The I/O adapter may also include the appropriate physical connectors to connect the I/O adapter with a corresponding communications medium. Examples of an I/O adapter may include a network interface, a network interface card (NIC), disc controller, video controller, audio controller, and so forth. The embodiments are not limited in this context.

When implemented as a wireless system, for example, media processing system 100 may include one or more wireless nodes arranged to communicate information over one or more types of wireless communication media. An example of wireless communication media may include portions of a wireless spectrum, such as the RF spectrum in general, and the ultra-high frequency (UHF) spectrum in particular. The wireless nodes may include components and interfaces suitable for communicating information signals over the designated wireless spectrum, such as one or more antennas, wireless transmitters/receivers ("transceivers"), amplifiers, filters, control logic, antennas, and so forth. The embodiments are not limited in this context.

In various embodiments, media processing system 100 may include one or more media source nodes 102-1-$n$. Media source nodes 102-1-$n$ may comprise any media source capable of sourcing or delivering media information and/or control information to media processing node 106. More particularly, media source nodes 102-1-$n$ may comprise any media source capable of sourcing or delivering digital audio and/or video (AV) signals to media processing node 106. Examples of media source nodes 102-1-$n$ may include any hardware or software element capable of storing and/or delivering media information, such as a Digital Versatile Disk (DVD) device, a Video Home System (VHS) device, a digital VHS device, a personal video recorder, a computer, a gaming console, a Compact Disc (CD) player, computer-readable or machine-readable memory, a digital camera, camcorder, video surveillance system, teleconferencing system, telephone system, medical and measuring instruments, scanner system, copier system, and so forth. Other examples of media source nodes 102-1-$n$ may include media distribution systems to provide broadcast or streaming analog or digital AV signals to media processing node 106. Examples of media distribution systems may include, for example, Over The Air (OTA) broadcast systems, terrestrial cable systems (CATV), satellite broadcast systems, and so forth. It is worthy to note that media source nodes 102-1-$n$ may be internal or external to media processing node 106, depending upon a given implementation. The embodiments are not limited in this context.

In various embodiments, the incoming video signals received from media source nodes 102-1-$n$ may have a native format, sometimes referred to as a visual resolution format. Examples of a visual resolution format include a digital television (DTV) format, high definition television (HDTV), progressive format, computer display formats, and so forth. For example, the media information may be encoded with a vertical resolution format ranging between 480 visible lines per frame to 1080 visible lines per frame, and a horizontal resolution format ranging between 640 visible pixels per line to 1920 visible pixels per line. In one embodiment, for example, the media information may be encoded in an HDTV video signal having a visual resolution format of 720 progressive (720p), which refers to 1280 horizontal pixels and 720 vertical pixels (1280×720), or 1080 interlaced (1080i), which refers to 1920 horizontal pixels and 1080 vertical pixels. In another example, the media information may have a visual resolution format corresponding to various computer display formats, such as a video graphics array (VGA) format resolution (640×480), an extended graphics array (XGA) format resolution (1024×768), a super XGA (SXGA) format resolution (1280×1024), an ultra XGA (UXGA) format resolution (1600×1200), and so forth. The embodiments are not limited in this context.

In various embodiments, media processing media processing system 100 may comprise a media processing node 106 to connect to media source nodes 102-1-$n$ over one or more communications media 104-1-$m$. Media processing node 106 may comprise any node as previously described that is arranged to process media information received from media source nodes 102-1-$n$. In various embodiments, media processing node 106 may comprise, or be implemented as, one or more media processing devices having a processing system, a processing sub-system, a processor, a computer, a device, an encoder, a decoder, a coder/decoder (CODEC), a filtering device (e.g., graphic scaling device, deblocking filtering device), a transformation device, an entertainment system, a display, or any other processing architecture. The embodiments are not limited in this context.

In various embodiments, media processing node 106 may include a media processing sub-system 108. Media processing sub-system 108 may comprise a processor, memory, and application hardware and/or software arranged to process media information received from media source nodes 102-1-$n$. For example, media processing sub-system 108 may be arranged to process, for example, an MPEG-2 compressed audio and/or video signal and perform other media processing operations as described in more detail below. Media processing sub-system 108 may output the processed media information to a display 110. The embodiments are not limited in this context.

In various embodiments, media processing node 106 may include a display 110. Display 110 may be any display capable of displaying media information received from media source nodes 102-1-$n$. Display 110 may display the media information at a given format resolution. For example, display 110 may display the media information on a display having a VGA format resolution, XGA format resolution, SXGA format resolution, UXGA format resolution, and so forth. In another embodiment, for example, the media information may be encoded in an HDTV video signal having a visual resolution format of 720 progressive (720p), which refers to 720 vertical pixels and 1280 horizontal pixels (720× 1280). In yet another embodiment, the media information may be encoded in an HDTV signal having a visual resolution format of 1080 interlaced (1080i), which refers to 1080 vertical pixels and 1920 horizontal pixels (1080×1920). The type of displays and format resolutions may vary in accordance with a given set of design or performance constraints, and the embodiments are not limited in this context.

In general operation, media processing node 106 may receive media information from one or more of media source nodes 102-1-n. For example, media processing node 106 may receive media information from a media source node 102-1 implemented as a DVD player integrated with media processing node 106. Media processing sub-system 108 may retrieve the media information from the DVD player, convert the media information from the visual resolution format to the display resolution format of display 110, and reproduce the media information using display 110.

In various embodiments, media processing node 106 may be arranged to receive an input image from one or more of media source nodes 102-1-n. The input image may comprise any data or media information derived from or associated with one or more video images. In various embodiments, the input image may comprise one or more of image data, video data, video sequences, groups of pictures, pictures, images, regions, objects, frames, slices, macroblocks, blocks, pixels, signals, and so forth. The values assigned to pixels may comprise real numbers and/or integer numbers.

In various embodiments, media processing node 106 may be arranged to operate as a graphics display device driver for an MPEG-2 compressed audio and/or video (AV) signal. More specifically, the media processing node of an embodiment may mitigate a macroblock data parsing bottleneck for a hardware-based motion-compensated inter-frame prediction (HWMC) graphics display device driver by directly generating macroblock instructions and storing them in a dedicated buffer. For example, an embodiment includes an independent DMA instruction execution buffer for macroblock instructions separate from the DMA instruction execution buffer for all other HWMC instructions. The generation and separation of the macroblock instructions from other HWMC instructions further allows better utilization of a dedicated graphics processing unit (GPU) to share a graphics display device driver processor workload.

In one embodiment, for example, media processing sub-system 108 of media processing node 106 may be arranged to include an independent DMA instruction execution buffer for macroblock instructions separate from the DMA instruction execution buffer for all other HWMC instructions. The generation and separation of the macroblock instructions from other HWMC instructions may further allow increased utilization of GPU to share a graphics display device driver processor workload. Media processing sub-system 108 may utilize one or more pre-defined or predetermined mathematical functions to control the HWMC instructions (e.g., generation, path, sequence, and/or buffering) and output (e.g., to display 110) to improve media processing system 100 performance. Media processing system 100 in general, and media processing sub-system 108 in particular, may be described in more detail with reference to FIG. 2.

Figure 2:
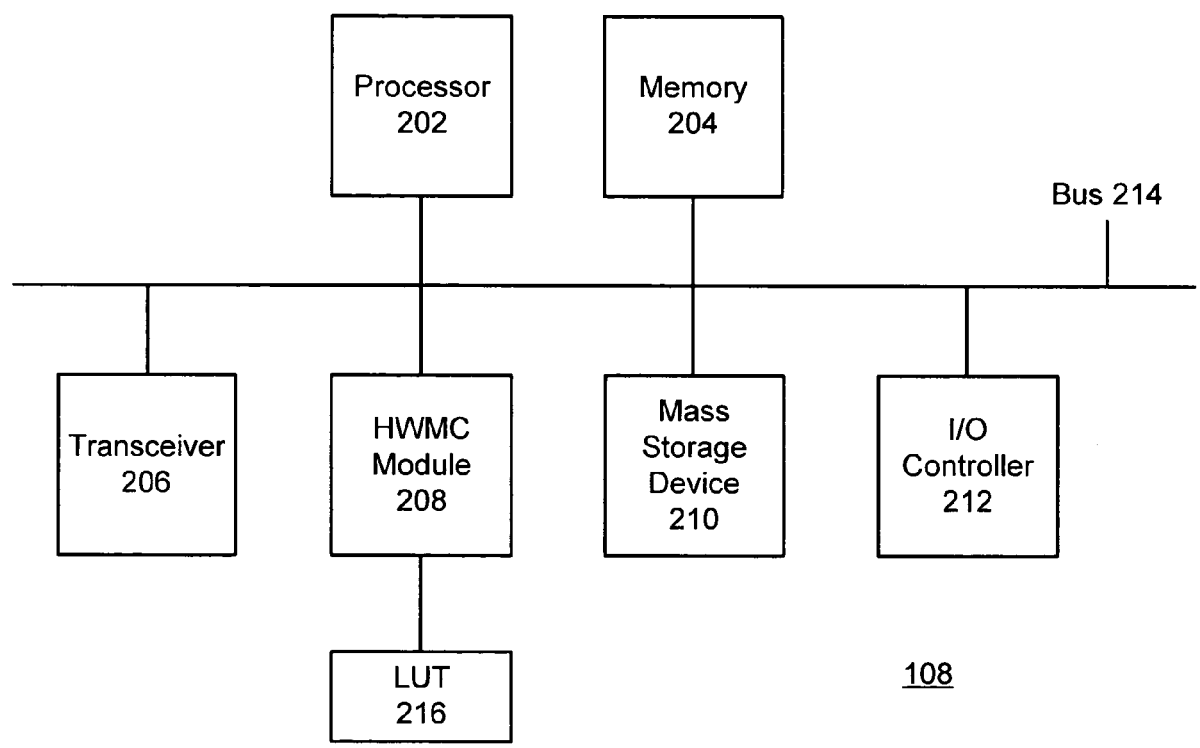
FIG. 2 illustrates one embodiment of a media processing sub-system.

FIG. 2 illustrates one embodiment of a media processing sub-system 108. FIG. 2 illustrates a block diagram of a media processing sub-system 108 suitable for use with media processing node 106 as described with reference to FIG. 1. The embodiments are not limited, however, to the example given in FIG. 2.

As shown in FIG. 2, media processing sub-system 108 may comprise multiple elements. One or more elements may be implemented using one or more circuits, components, registers, processors, software subroutines, modules, or any combination thereof, as desired for a given set of design or performance constraints. Although FIG. 2 shows a limited number of elements in a certain topology by way of example, it can be appreciated that more or less elements in any suitable topology may be used in media processing sub-system 108 as desired for a given implementation. The embodiments are not limited in this context.

In various embodiments, media processing sub-system 108 may include a processor 202. Processor 202 may be implemented using any processor or logic device, such as a complex instruction set computer (CISC) microprocessor, a reduced instruction set computing (RISC) microprocessor, a very long instruction word (VLIW) microprocessor, a processor implementing a combination of instruction sets, or other processor device. In one embodiment, for example, processor 202 may be implemented as a general purpose processor, such as a processor made by Intel® Corporation, Santa Clara, Calif. Processor 202 may also be implemented as a dedicated processor, such as a controller, microcontroller, embedded processor, a digital signal processor (DSP), a network processor, a media processor, an input/output (I/O) processor, a media access control (MAC) processor, a radio baseband processor, a field programmable gate array (FPGA), a programmable logic device (PLD), and so forth. The embodiments are not limited in this context.

In one embodiment, media processing sub-system 108 may include a memory 204 to couple to processor 202. Memory 204 may be coupled to processor 202 via communications bus 214, or by a dedicated communications bus between processor 202 and memory 204, as desired for a given implementation. Memory 204 may be implemented using any machine-readable or computer-readable media capable of storing data, including both volatile and non-volatile memory. For example, memory 204 may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. It is worthy to note that some portion or all of memory 204 may be included on the same integrated circuit as processor 202, or alternatively some portion or all of memory 204 may be disposed on an integrated circuit or other medium, for example a hard disk drive, that is external to the integrated circuit of processor 202. The embodiments are not limited in this context.

In various embodiments, media processing sub-system 108 may include a transceiver 206. Transceiver 206 may be any radio transmitter and/or receiver arranged to operate in accordance with a desired wireless protocols. Examples of suitable wireless protocols may include various wireless local area network (WLAN) protocols, including the IEEE 802.xx series of protocols, such as IEEE 802.11a/b/g/n, IEEE 802.16, IEEE 802.20, and so forth. Other examples of wireless protocols may include various wireless wide area network (WWAN) protocols, such as Global System for Mobile Communications (GSM) cellular radiotelephone system protocols with General Packet Radio Service (GPRS), Code Division Multiple Access (CDMA) cellular radiotelephone communication systems with 1xRTT, Enhanced Data Rates for Global Evolution (EDGE) systems, and so forth. Further examples of wireless protocols may include wireless personal area network (PAN) protocols, such as an Infrared protocol, a protocol from the Bluetooth Special Interest Group (SIG) series of protocols, including Bluetooth Specification versions v1.0, v1.1, v1.2, v2.0, v2.0 with Enhanced Data Rate (EDR), as well as one or more Bluetooth Profiles (collectively referred to herein as "Bluetooth Specification"), and so forth. Other suitable protocols may include Ultra Wide Band (UWB), Digital Office (DO), Digital Home, Trusted Platform Module (TPM), ZigBee, and other protocols. The embodiments are not limited in this context.

In various embodiments, media processing sub-system 108 may include one or more modules. The modules may comprise, or be implemented as, one or more systems, sub-systems, processors, devices, machines, tools, components, circuits, registers, applications, programs, subroutines, or any combination thereof, as desired for a given set of design or performance constraints. The embodiments are not limited in this context.

In one embodiment, for example, media processing sub-system 108 may include an HWMC module 208. HWMC module 208 may be used to coordinate the generation, path, sequence, and/or buffering of instructions for a GPU to process MPEG-2 compressed AV signals as introduced above according to predetermined mathematical functions or algorithms. For example, the predetermined mathematical functions or algorithms may be stored in any suitable storage device, such as memory 204, a mass storage device 210, a hardware-implemented lookup table (LUT) 216, and so forth. It may be appreciated that HWMC module 208 may be implemented as software executed by processor 202, dedicated hardware, or a combination of both. The embodiments are not limited in this context.

In various embodiments, media processing sub-system 108 may include a mass storage device 210. Examples of mass storage device 210 may include a hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of DVD devices, a tape device, a cassette device, or the like. The embodiments are not limited in this context.

In various embodiments, media processing sub-system 108 may include one or more I/O adapters 212. Examples of I/O adapters 212 may include Universal Serial Bus (USB) ports/adapters, IEEE 1394 Firewire ports/adapters, and so forth. The embodiments are not limited in this context.

In general operation, media processing sub-system 108 may receive media information from one or more media source nodes 102-1-n. For example, media source node 102-1 may comprise a DVD device connected to processor 202. Alternatively, media source 102-2 may comprise memory 204 storing a digital AV file, such as an MPEG encoded AV file. The HWMC module 208 may operate to receive the media information from mass storage device 216 and/or memory 204, process the media information (e.g., via processor 202), and store or buffer the media information on memory 204, the cache memory of processor 202, or a combination thereof. The operation of the HWMC module 208 may be understood with reference to the HWMC drivers illustrated by FIGS. 3 and 4, and by the logic flows of FIG. 5.

Figure 3:
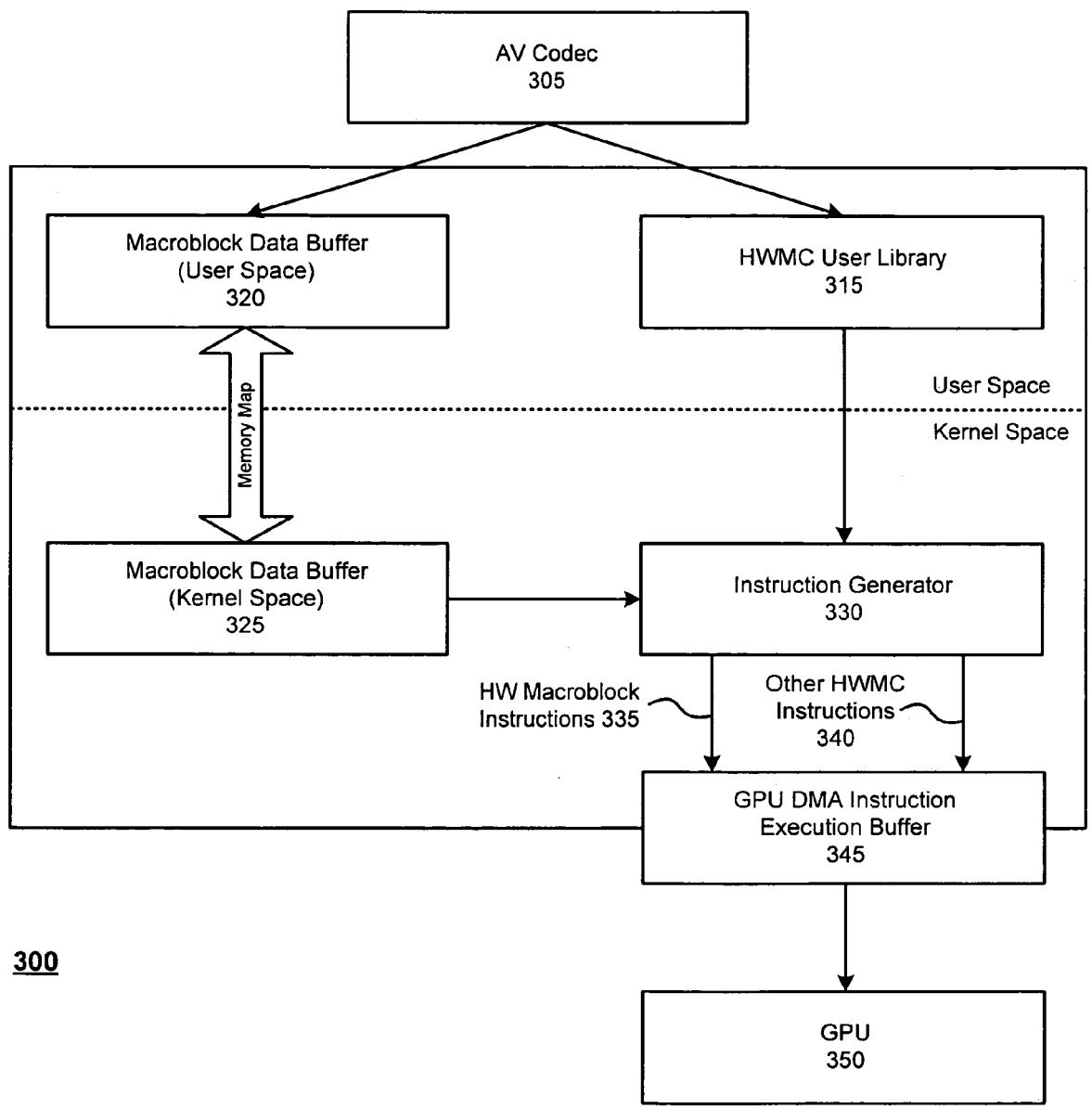
FIG. 3 illustrates one embodiment of a hardware motion compensation driver.

FIG. 3 illustrates a HWMC driver 300. In general, for an MPEG-2 AV signal, a current picture can be translated from previous pictures based on intra-frame Discrete Cosine Transform (DCT) coding coefficients and motion-compensated inter-frame prediction. Motion-compensated inter-frame prediction is a pixel by pixel rendering process that is time and processor consuming. For example, motion-compensated inter-frame prediction may represent approximately 30% of the total processing workload in an MPEG-2 video codec process.

HWMC driver 300 may include, or have access to, a GPU 350. The GPU, for example as part of a graphics chipset made by Intel® Corporation, Santa Clara, Calif., may have the capability of hardware-based motion-compensated inter-frame prediction. HWMC is a technique that may allow the GPU 350 to reduce the motion-compensated inter-frame prediction workload of processor 202. As such, the HWMC technique may improve decoding performance by working in parallel with the processor 202, either by increasing the frames per second for a given processor 202 usage or decrease the processor 202 usage for a given frames per second, for example.

The inputs to the HWMC driver 300 include DCT coefficient data arrays and the macroblock parameters data array. The macroblock parameters are combined by macroblock type, motion type, motion vectors and other macroblock parameters, all of which contribute to the GPU 350 rendering the pixels of the target picture. The HWMC driver 300 provides a memory buffer for an AV codec 305 to write macroblock parameters one by one. The HWMC driver 300 also provides a DCT raw data buffer for the video codec 305 to write DCT data. For example, the DCT data may include an entire or only part of a picture depending on the portion or entirety a user wants to decode. After the AV codec 305 has completed storing the macroblock data and DCT data into buffers, it can issue a request to GPU 350 to begin the HWMC process. In such a manner, for example, the processor 202 is released to decode the next picture or process other job.

For HWMC driver 300, it may be important to note the difference between DCT data and macroblock data. For example, DCT raw data is standard and can be directly consumed by GPU 350 regardless of HWMC hardware implementation. Conversely, the macroblock data contains all of the parameters to control motion compensation, for which different HWMC hardware implementations might have different instructions. Accordingly, the macroblock data may be parsed by the HWMC driver 300 to generate the relative hardware-dependent motion compensation instructions or other low-level representations that may be thereafter processed by the GPU 350.

More specifically, for HWMC driver 300, the AV codec 305 stores the macroblock and DCT data into the data buffer provided by HWMC driver 300. The macroblock data buffer 325 in kernel space may be mapped to the macroblock data buffer 320 in user space, and as it runs in user space, the AV codec 305 can thereby store the macroblock data in the macroblock data buffer 320 in user space to avoid memory copy. As noted, unlike DCT data, macroblock data are defined by HWMC driver 300 in a platform independent structure. Accordingly, HWMC driver 300 may parse the macroblock parameters by reading each macroblock datum from the macroblock data buffer 325 to generate the hardware macroblock instruction 335 (e.g., at instruction generator 330) for GPU 350. Hardware macroblock instructions 335 may include, for example, motion vectors and other motion compensation parameters. Instruction generator 330 further generates other HWMC instructions 340 that may contain, for example, instructions related to hardware configuration, HWMC state management, frame setup, and buffer management. The hardware macroblock instructions 335 and other HWMC instructions 340 are thereafter written to a GPU direct memory access (DMA) instruction execution buffer for the GPU 350 to read and execute.

For example, for a 1080i HD picture (interlaced 1920× 1080 visual resolution format) the size of the macroblock data is approximately 200 kilobytes. As noted, video codec 305 stores the macroblock data into the macroblock data buffer 325 mapped to macroblock data buffer 320 in user space. Thereafter, the HWMC driver 300 parses the macroblock data from the macroblock data buffer 325 and the instruction generator 330 generates instructions (e.g., both hardware macroblock instructions 335 and other HWDMC instructions 340) into the GPU DMA instruction execution buffer 345 for execution by the GPU 350. The hardware macroblock instruction 335 generation by the instruction generator 330, however, may account for approximately up to 95% of the processor 202 usage for HWMC driver 300. In this way, hardware macroblock instruction 335 generation may be a performance-hindering feature or "bottleneck" of HWMC driver 300.

Further, for HWMC driver 300, it may be impossible to directly share the GPU DMA instruction execution buffer 345 to a user because the HWMC driver 300 process might be interrupted by other graphics operations. In such a situation, if the DMA instruction execution buffer 345 were locked, other graphics operations would be blocked, potentially to the detriment of media processing system 100 or sub-systems thereof.

Figure 4:
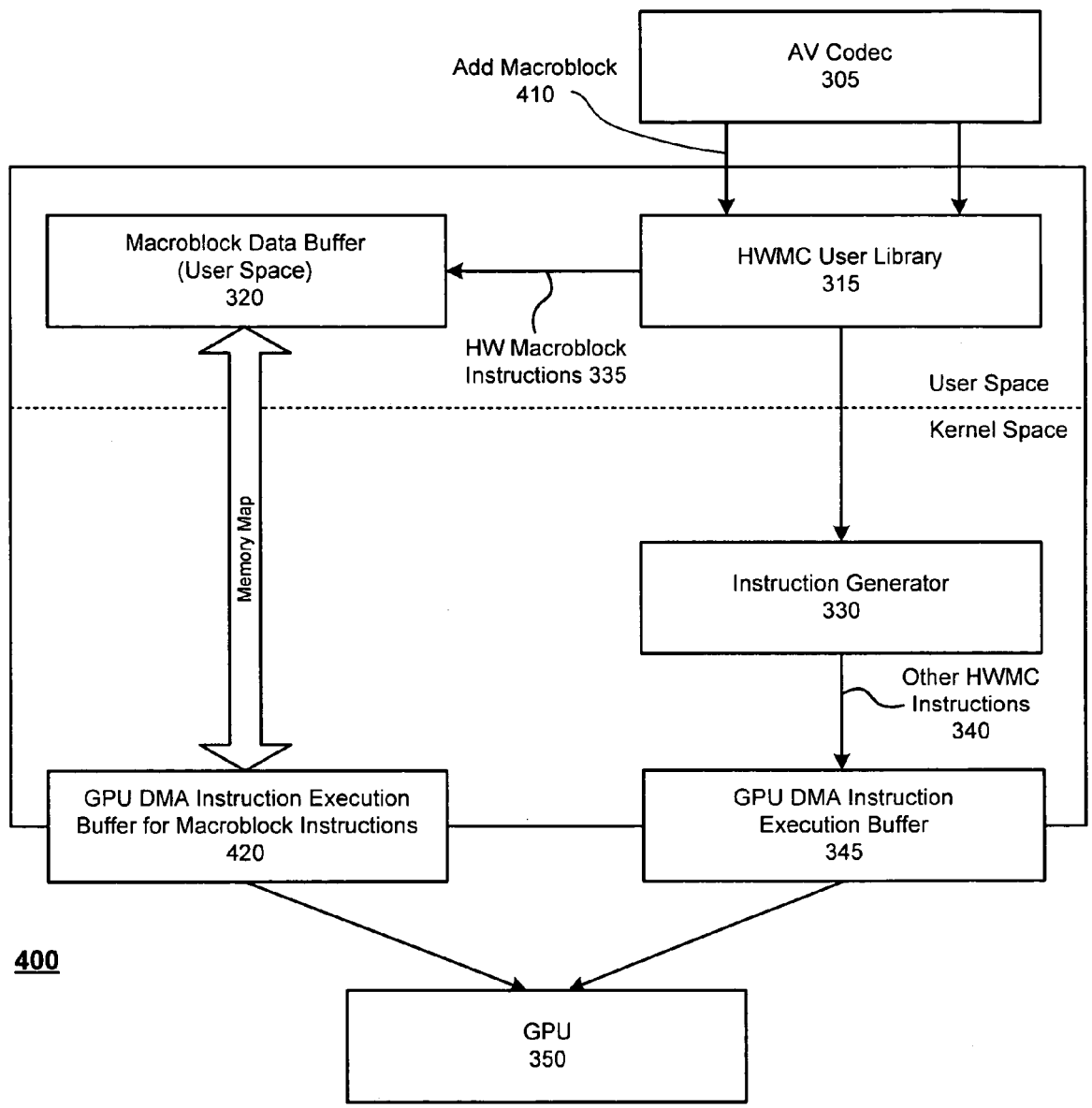
FIG. 4 illustrates one embodiment of a hardware motion compensation driver.

FIG. 4 illustrates HWMC driver 400 of an embodiment. As noted with respect to FIG. 3, the hardware macroblock instruction 335 generation by instruction generator 330 may be a performance-hindering feature or "bottleneck" of HWMC driver 300. HWMC driver 400 includes various features to mitigate the bottleneck of macroblock data parsing and macroblock instruction 335 generation of HWMC driver 300.

For example, the HWMC driver 400 includes a standalone GPU DMA instruction buffer for macroblock instructions 420 independent of GPU DMA instruction execution buffer 345. Accordingly, GPU DMA instruction buffer for macroblock instructions 420 stores hardware macroblock instructions 335 while GPU DMA instruction execution buffer 345 stores other HWMC instructions 340. Further, GPU DMA instruction buffer for macroblock instructions 420 may be mapped to user space as macroblock data buffer 320.

In an embodiment, the GPU 350 is capable of hardware instruction batch buffer execution. Accordingly, the GPU 350 may execute other HWMC instructions 340 stored in the GPU DMA instruction execution buffer 345, jump to hardware macroblock instructions 335 stored in the GPU DMA instruction buffer for macroblock instructions 420 and execute them as a batch, then return to the other HWMC instructions 340 when complete.

Further, the HWMC driver 400 includes an add macroblock 410 function call from the AV codec 305 to the HWMC user library 315 for the HWMC user library 315 to accept the AV codec's 305 input on macroblock data/parameters. In an embodiment, the HWMC user library 315 can directly generate hardware macroblock instructions 335 without utilizing the instruction generator 330. The hardware macroblock instructions 335 may thereafter be mapped between the macroblock data buffer 320 in user space and the GPU DMA instruction execution buffer for macroblock instructions 420. In this manner, the HWMC driver 400 may alleviate the bottleneck of HWMC driver 300 (e.g., the instruction generator 330 generating both the hardware macroblock instructions 335 and the other HWMC instructions 340). Said alternatively, when the HWMC driver 400 generates hardware macroblock instructions 335 at the HWMC user library 315 and stores them in GPU DMA instruction execution buffer for macroblock instructions 420, the HWMC driver 400 may merely configures the GPU 350 to execute hardware macroblock instructions 335 as a batch buffer instruction execution. Thereafter, for example like a function call, once the GPU 350 has executed the hardware macroblock instruction 335 as a batch buffer instruction execution, it may return to the other HWMC instructions 340 stored in the GPU DMA instruction execution buffer 345.

In addition, mapping the macroblock instructions 335 to user space (e.g., to macroblock data buffer 320) by way of add macroblock 410 function call may also provide a more convenient and user-friendly interface versus the user writing to the macroblock data buffer 325. Further, as the HWMC user library 315 of an embodiment may provide an application programming interface (API), it may accordingly be easier for the AV codec 305 to change from software motion compensation to hardware motion compensation. Further still, hardware macroblock instructions 335 are more data oriented than other HWMC instructions 340. As a result, the HWMC user library 315 generating the hardware macroblock instructions 335 may be easier to debug and maintain versus the scheme of HWMC driver 300. Finally, the HWMC user library 315 generating the hardware macroblock instructions 335 may allow the disclosure of the format of hardware macroblock instructions 335 to a user without disclosing further details of the HWMC driver 400 if so desired.

In an embodiment, the HWMC driver 400 demonstrated improved performance versus HWMC driver 300. For example, for an MPEG-2 1080i AV stream, the HWMC driver 400 as tested on an Intel GMCH 82854 SunsetValley development board demonstrated more than a 50% performance improvement. More specifically, versus HWMC driver 300, HWMC driver 400 of an embodiment was capable of 24 frames per second versus 15 frames per second without increasing the load on, for example, processor 202.

Figure 5:
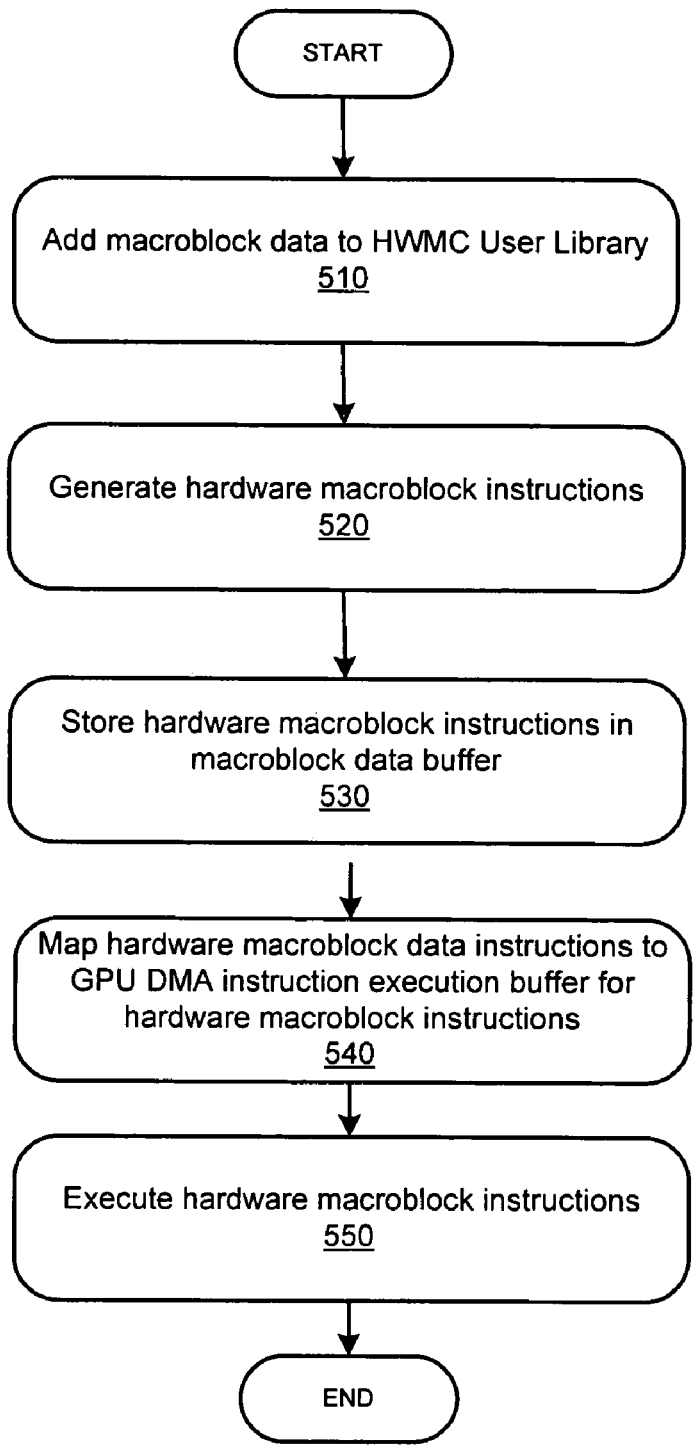
FIG. 5 illustrates one embodiment of a logic flow.

FIG. 5 illustrates a logic flow of an embodiment. Once, for example, AV codec 305 has received macroblock and DCT data, at 510 the macroblock data is added with a function call to the HWMC user library 315. At 520, the HWMC user library 315 generates a hardware macroblock instruction 335 and, at 530, the hardware macroblock instruction 335 stored in the macroblock data buffer 320. Thereafter, at 540, the hardware macroblock instruction 335 stored in the macroblock data buffer 320 is mapped to a GPU DMA instruction execution buffer for macroblock instructions 420, from which the GPU, at 550, can execute the hardware macroblock instruction 335.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

It is also worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some embodiments may be implemented using an architecture that may vary in accordance with any number of factors, such as desired computational rate, power levels, heat tolerances, processing cycle budget, input data rates, output data rates, memory resources, data bus speeds and other performance constraints. For example, an embodiment may be implemented using software executed by a general-purpose or special-purpose processor. In another example, an embodiment may be implemented as dedicated hardware. In yet another example, an embodiment may be implemented by any combination of programmed general-purpose computer components and custom hardware components. The embodiments are not limited in this context.

Various embodiments may be implemented using one or more hardware elements. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. The embodiments are not limited in this context.

Various embodiments may be implemented using one or more software elements. In general, a software element may refer to any software structures arranged to perform certain operations. In one embodiment, for example, the software elements may include program instructions and/or data adapted for execution by a hardware element, such as a processor. Program instructions may include an organized list of commands comprising words, values or symbols arranged in a predetermined syntax, that when executed, may cause a processor to perform a corresponding set of operations. The software may be written or coded using a programming language. Examples of programming languages may include C, C++, BASIC, Perl, Matlab, Pascal, Visual BASIC, JAVA, ActiveX, assembly language, machine code, and so forth. The software may be stored using any type of computer-readable media or machine-readable media. Furthermore, the software may be stored on the media as source code or object code. The software may also be stored on the media as compressed and/or encrypted data. Examples of software may include any software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. The embodiments are not limited in this context.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, and the like. The instructions may be implemented using any suitable high-level, low-level, object-oriented, visual, compiled and/or interpreted programming language, such as C, C++, Java, BASIC, Perl, Matlab, Pascal, Visual BASIC, assembly language, machine code, and so forth. The embodiments are not limited in this context.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

While certain features of the embodiments have been illustrated as described herein, many modifications, substitutions, changes and equivalents will now occur to those skilled in the art. It is therefore to be understood that the appended claims are intended to cover all such modifications and changes as fall within the true spirit of the embodiments.

The invention claimed is:
1. An apparatus comprising:
a media processing node comprising:
    a direct memory access instruction execution buffer for macroblock instructions in kernel space, the macroblock instructions comprising motion vectors;
    a separate direct memory access instruction execution buffer for other hardware motion compensation instructions, the other hardware motion compensation instructions comprising instructions related to hardware configuration;

a hardware motion compensation module to add macroblock data to a hardware motion compensation user library, to generate in user space, by the hardware motion compensation user library, a hardware macroblock instruction for a graphics processing unit, to store the hardware macroblock instruction in a macroblock data buffer in user space, and to map the hardware macroblock instruction in the macroblock data buffer in user space to the direct memory access instruction execution buffer for macroblock instructions in kernel space; and an instruction generator to generate, in kernel space, other hardware motion compensation instructions for the graphics processing unit.

2. The apparatus of claim 1, the hardware motion compensation module to further cause the graphics processing unit to execute the hardware macroblock instruction from the direct memory access instruction execution buffer for macroblock instructions for the graphics processing unit.

3. The apparatus of claim 2, the hardware motion compensation module to further cause the graphics processing unit to execute another hardware motion compensation instruction from the direct memory access instruction execution buffer for other hardware motion compensation instructions for the graphics processing unit.

4. A system comprising:
a communications medium; and
a media processing node comprising:
a direct memory access instruction execution buffer for macroblock instructions in kernel space, the macroblock instructions comprising motion vectors;
a separate direct memory access instruction execution buffer for other hardware motion compensation instructions, the other hardware motion compensation instructions comprising instructions related to hardware configuration;
a hardware motion compensation module to add macroblock data to a hardware motion compensation user library, to generate in user space, by the hardware motion compensation user library, a hardware macroblock instruction for a graphics processing unit, to store the hardware macroblock instruction in a macroblock data buffer in user space, and to map the hardware macroblock instruction in the macroblock data buffer in user space to the direct memory access instruction execution buffer for macroblock instructions in kernel space; and
an instruction generator to generate, in kernel space, other hardware motion compensation instructions for the graphics processing unit.

5. The system of claim 4, the hardware motion compensation module to further cause the graphics processing unit to execute the hardware macroblock instruction from the direct memory access instruction execution buffer for macroblock instructions for the graphics processing unit.

6. The system of claim 5, the hardware motion compensation module to further cause the graphics processing unit to execute another hardware motion compensation instruction from the direct memory access instruction execution buffer for other hardware motion compensation instructions for the graphics processing unit.

7. A method comprising:
adding macroblock data to a hardware motion compensation user library;
generating in user space, by the hardware motion compensation user library, a hardware macroblock instruction for a graphics processing unit, the hardware macroblock instruction comprising a motion vector;
storing the hardware macroblock instruction in a macroblock data buffer in user space;
mapping the hardware macroblock instruction in the macroblock data buffer in user space to a direct memory access instruction execution buffer for macroblock instructions in kernel space; and
generating in kernel space, by an instruction generator, other hardware motion compensation instructions for the graphics processing unit, the other hardware motion compensation instructions comprising instructions related to hardware configuration.

8. The method of claim 7 further comprising executing, by the graphics processing unit, the hardware macroblock instruction from the graphics processing unit direct memory access instruction execution buffer.

9. The method of claim 8 further comprising executing, by the graphics processing unit, another hardware motion compensation instruction from another graphics processing unit direct memory access instruction execution buffer.

10. An article of manufacture comprising a machine-readable storage medium containing instructions that if executed by a processor enable a system to add macroblock data to a hardware motion compensation user library, generate in user space, by the hardware motion compensation user library, a hardware macroblock instruction for a graphics processing unit, the hardware macroblock instruction comprising a motion vector, store the hardware macroblock instruction in a macroblock data buffer in user space, map the hardware macroblock instruction in the macroblock data buffer in user space to a direct memory access instruction execution buffer for macroblock instructions in kernel space; and generate in kernel space, by an instruction generator, other hardware motion compensation instructions for the graphics processing unit, the other hardware motion compensation instructions comprising instructions related to hardware configuration.

11. The article of manufacture of claim 10 further comprising instructions that if executed enable the system to execute, by the graphics processing unit, the hardware macroblock instruction from the graphics processing unit direct memory access instruction execution buffer.

12. The article of manufacture of claim 11, further comprising instructions that if executed enable the system to execute, by the graphics processing unit, another hardware motion compensation instruction from another graphics processing unit direct memory access instruction execution buffer.

* * * * *